United States Patent
Jin et al.

(10) Patent No.: US 11,662,490 B2
(45) Date of Patent: May 30, 2023

(54) SOLID-STATE HYDROPHONE WITH SHIELDING

(71) Applicant: Halliburton Energy Services, Inc., Houston, TX (US)

(72) Inventors: Jing Jin, Singapore (SG); George David Goodman, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 832 days.

(21) Appl. No.: 16/323,944

(22) PCT Filed: Sep. 28, 2016

(86) PCT No.: PCT/US2016/054135
§ 371 (c)(1),
(2) Date: Feb. 7, 2019

(87) PCT Pub. No.: WO2018/063185
PCT Pub. Date: Apr. 5, 2018

(65) Prior Publication Data
US 2021/0286096 A1 Sep. 16, 2021

(51) Int. Cl.
*G01V 1/18* (2006.01)
*E21B 47/001* (2012.01)
(Continued)

(52) U.S. Cl.
CPC ............ *G01V 1/186* (2013.01); *E21B 47/001* (2020.05); *E21B 47/01* (2013.01); *E21B 47/14* (2013.01);
(Continued)

(58) Field of Classification Search
CPC combination set(s) only.
See application file for complete search history.

(56) References Cited

U.S. PATENT DOCUMENTS 3,506,076 A * 4/1970 Angona ............. H01L 41/0835
175/57
3,576,219 A * 4/1971 Angona .................. E21B 7/007
175/4.54
(Continued)

FOREIGN PATENT DOCUMENTS

WO 2016080951 5/2016
WO WO-2016080951 A * 5/2016 ............. E21B 47/06

OTHER PUBLICATIONS

EP16917895.1, "Extended European Search Report", dated Apr. 1, 2020, 11 pages.
(Continued)

*Primary Examiner* — Daniel L Murphy
*Assistant Examiner* — Amie M Ndure
(74) *Attorney, Agent, or Firm* — Kilpatrick Townsend & Stockton LLP (57) ABSTRACT

A solid-state hydrophone may include a piezoelectric rod positioned between at least two electrodes. The piezoelectric rod may be disposed within a metallic housing to shield the piezoelectric rod and its connections from acoustic and electromagnetic waves. The piezoelectric rod and the electrodes may be potted in the mechanical housing using a potting material that may be positioned adjacent to the piezoelectric rod. At least a layer of the potting material may be positioned between the piezoelectric rod and the metallic housing to physically separate the piezoelectric rod from the metallic housing.

20 Claims, 8 Drawing Sheets

(51) Int. Cl.
    *E21B 47/14*     (2006.01)
    *G01V 1/38*     (2006.01)
    *G01V 1/40*     (2006.01)
    *G01V 1/52*     (2006.01)
    *E21B 47/01*     (2012.01)

(52) U.S. Cl.
    CPC ............... *G01V 1/38* (2013.01); *G01V 1/40* (2013.01); *G01V 1/52* (2013.01)

(56) References Cited

U.S. PATENT DOCUMENTS

| | | | | |
|---|---|---|---|---|
| 3,712,410 | A * | 1/1973 | Gollwitzer | B06B 1/0215 367/140 |
| 4,525,645 | A | 6/1985 | Shirley et al. | |
| 4,933,919 | A | 6/1990 | Geil et al. | |
| 5,276,657 | A | 1/1994 | Newnham et al. | |
| 5,412,621 | A | 5/1995 | Hepp | |
| 7,207,397 | B2 * | 4/2007 | Miyamoto | G01V 1/52 175/50 |
| 8,893,547 | B2 * | 11/2014 | DiFoggio | G01V 1/52 73/152.51 |
| 2002/0136091 | A1 * | 9/2002 | Pearce | G01V 1/201 367/188 |
| 2005/0000279 | A1 | 1/2005 | Yogeswaren | |
| 2005/0022987 | A1 | 2/2005 | Green et al. | |
| 2005/0067191 | A1 * | 3/2005 | Miyamoto | G01V 1/52 175/50 |
| 2015/0275655 | A1 | 10/2015 | Swett et al. | |
| 2015/0285066 | A1 * | 10/2015 | Keller | E21B 17/1078 367/82 |
| 2016/0238720 | A1 | 8/2016 | Gao et al. | |
| 2017/0248724 | A1 * | 8/2017 | Chang | G01V 1/50 |
| 2017/0299751 | A1 * | 10/2017 | Chang | B06B 1/0644 |

OTHER PUBLICATIONS

International Patent Application No. PCT/US2016/054135, "International Search Report and Written Opinion", dated Jun. 15, 2017, 16 pages.

* cited by examiner

SOLID-STATE HYDROPHONE WITH SHIELDING

TECHNICAL FIELD

The present disclosure relates generally to hydrophone devices, and, more particularly, although not necessarily exclusively, to solid-state hydrophone devices with a shield housing for high-pressure, high-temperature environments.

BACKGROUND

Conventional hydrophones may include a piezoelectric tube for use as a sensing element. An inner surface of the piezoelectric tube may be isolated from outside pressure disturbance caused by acoustic waves. For low-to-medium pressure environments, such as shallow water environments, a cavity of the piezoelectric tube may be filled with air. For higher-pressure environments, such as deep-water environments or downhole wellbore environments, the cavity may be oil-filled and include a capillary hole connectable to an oil reservoir for pressure compensation.

DETAILED DESCRIPTION

Certain aspects and examples of the present disclosure relate to a solid-state hydrophone having a piezoelectric rod shielded by a metallic housing for use in high-pressure, high-temperature environments to sense acoustic signals downhole. The piezoelectric rod may include a solid piezoelectric material defining a contiguous rod having no cavities or openings. The metallic housing may have a high acoustic impedance to shield the piezoelectric rod's surfaces from acoustic waves. In some aspects, the metallic housing may include a housing wire that may be connected to a local reference potential, such as a ground or chassis ground, to cause the metal material of the metallic housing to create an electromagnetic shield for the piezoelectric rod. The piezoelectric rod may be potted in the metallic housing using a potting material, such as epoxy potting material, to provide additional protection to the piezoelectric rod. The thickness of the potting material between the piezoelectric rod and the metallic housing may correspond to the effective piezoelectric coefficient of the hydrophone, defining the capabilities of the piezoelectric rod to generate a charge in response to stress. Electrodes may be disposed onto distal ends of the piezoelectric rod and include wires soldered thereto that may be connected to measuring circuit to transmit the charge to a measuring circuit.

A hydrophone according to some aspects may allow the hydrophone to be used in high-pressure or high-temperature environments. In some aspects, the hydrophone may be used in high-pressure environments, such as deep in a wellbore or ocean body, without the piezoelectric material itself being configured for pressure compensation. For example, the metallic housing may shield the piezoelectric rod against acoustic waves in the high-pressure environment in a manner that eliminates a need for an oil cavity in the piezoelectric rod to balance the pressure exerted on the hydrophone in high-pressure environments. The design of the hydrophone according to aspects of the present disclosure may be simplified to include a solid piezoelectric rod without a cavity or oil-reservoir attached to the reservoir. The simple design may reduce manufacturing costs of the hydrophone and allow the hydrophone to be more compact. In some aspects, a smaller hydrophone may allow a tool within which the hydrophone is placed to have a compact size.

In some aspects, the hydrophone may also for monitoring acoustic waves in low-noise environments having electrical interference from components proximate to the hydrophone. For example, the hydrophone may be installed in a motor-driven, borehole-scanning device. A metallic housing of the hydrophone according to some aspects, may shield a piezoelectric rod positioned in the metallic housing from noise generated by the motor of the device, but allow the hydrophone to have sufficient sensitivity to sense other acoustic waves in the environment. In some aspects, the hydrophone may also be used in high-temperature environments downhole in a wellbore as the epoxy material potting may include a low coefficient of thermal expansion increase its robustness at higher temperatures.

As used herein, the term "hydrophone" may include acoustic sensing devices as well as transducers, or other transmit or receive devices for pulsed applications.

Figure 1:
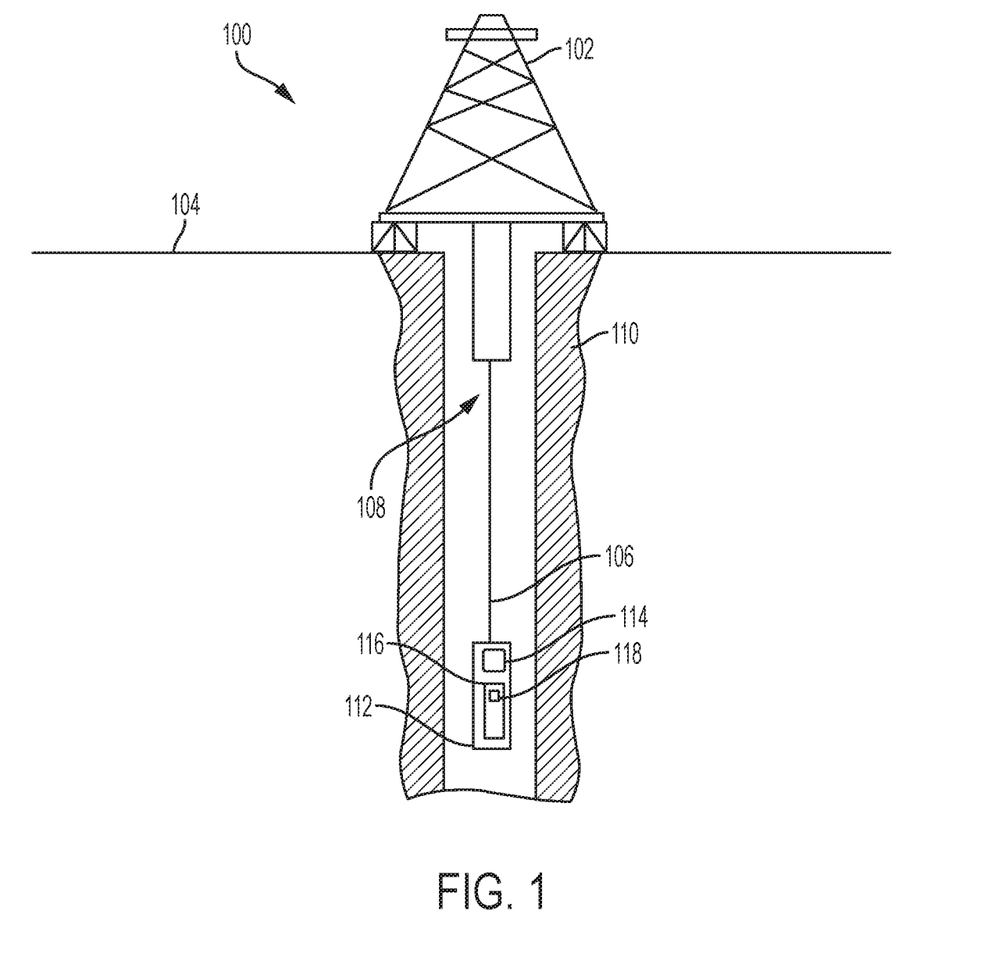
FIG. 1 is a cross-sectional schematic diagram depicting an example of a wellbore environment including a downhole tool with a hydrophone according to an aspect of the present disclosure.

Various aspects of the present disclosure may be implemented in various environments. For example, FIG. 1 is a cross-sectional schematic diagram depicting an example of a wellbore environment 100 for a hydrophone according to one aspect of the present disclosure. The wellbore environment 100 includes a derrick 102 positioned at a surface 104 of the earth. The derrick 102 may support components of the wellbore environment 100, including a wireline 106. In some aspects, the wireline 106 may be mechanically connected to the derrick 102 by a tubing string. The wireline 106 may extend from the tubing string into a wellbore 108 drilled into a subterranean formation 110 of the earth. The derrick 102 may include components to raise and lower, via the wireline 106, a wellbore tool 112 attached to the wireline 106 within the wellbore 108. In some aspects, the wellbore tool 112 may include a monitoring tool or scanning tool positioned in the wellbore to obtain information about the wellbore 108 or the subterranean formation 110. In some aspects, the wellbore tool 112 may be submersed in fluid within the wellbore 108. For example, the wellbore 108 may include drilling fluid during and subsequent to drilling operations in the wellbore 108. In another example, the wellbore 108 may include fracturing fluid during or subsequent to fracturing operations in the wellbore 108. In a third example, the wellbore 108 may include production fluid including hydrocarbons extracted from the subterranean formation 110.

The wellbore tool 112 includes a motor 114 that is integral or coupled to the wellbore tool 112 to drive the wellbore tool 112 and allow it to rotate on the wireline 106 within the wellbore 108 to scan various surfaces of the subterranean formation 110 or various locations within the wellbore 108. The wellbore tool 112 also includes a cavity 116. In some aspects, the cavity 116 may include a through-bore extending through all or a portion of the wellbore tool 112. In other aspects, the cavity 116 may include an open space within the wellbore tool 112 including wires or other means for electrically coupling one or more sensors to the wellbore tool 112 for performing the monitoring or scanning operations in the wellbore 108. In some aspects, the sensors positioned in the cavity 116 of the wellbore tool 112 may include a hydrophone. Block 118 represents an example placement of one or more hydrophones according to aspects of the present disclosure within the cavity 116 of the wellbore tool 112

Figure 2:
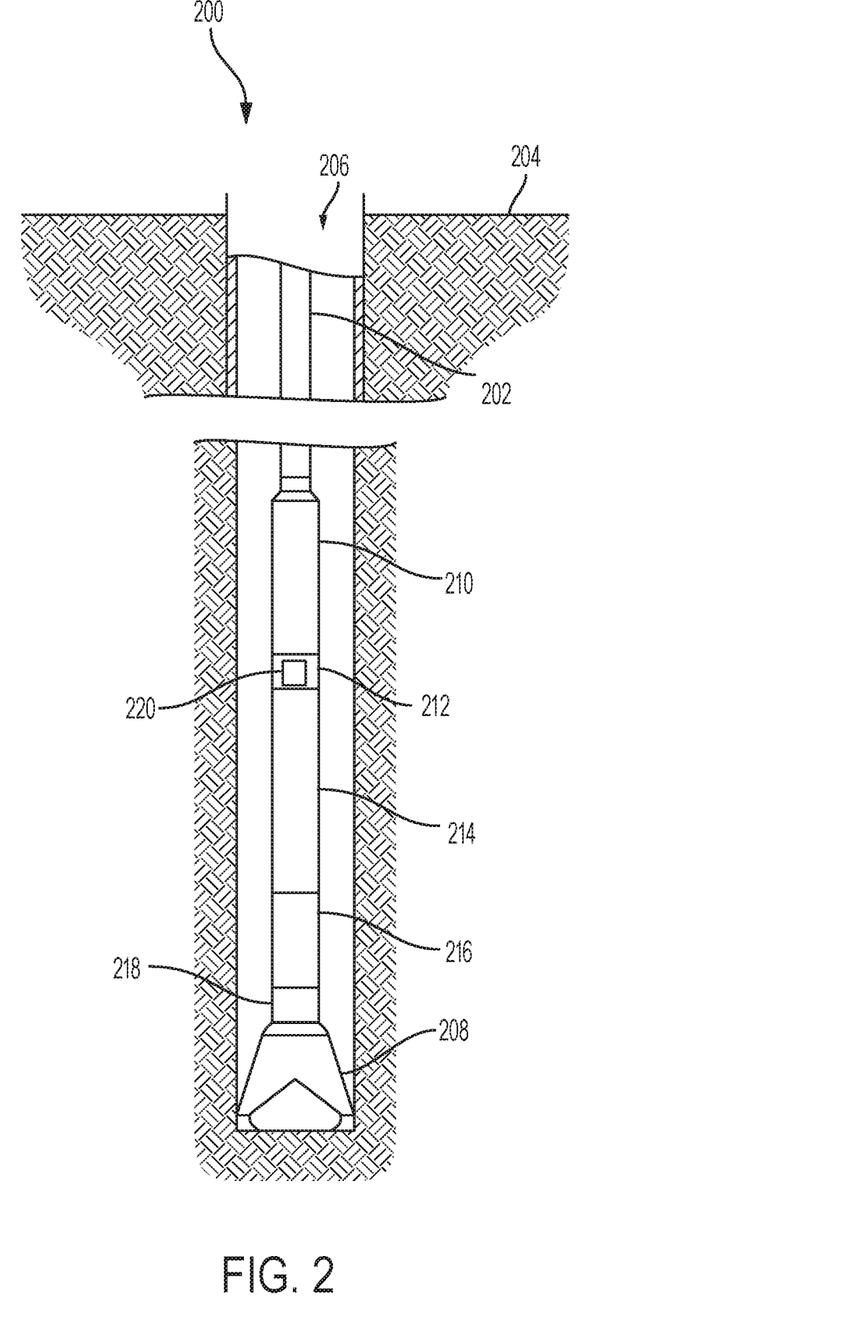
FIG. 2 is a cross-sectional schematic diagram depicting an example of a wellbore environment including a logging while drilling tool with a hydrophone according to an aspect of the present disclosure.

Another example of an environment that may implement aspects of the present disclosure is a wellbore drilling environment. For example, FIG. 2 is a cross-sectional schematic diagram depicting an example of a wellbore drilling environment 200 including a logging while drilling tool with a hydrophone according to an aspect of the present disclosure. The wellbore drilling environment 200 includes a drill string 202 of a drilling rig (not shown) that extends below a surface 204 into a wellbore 206. The drill string 202 may transmit drilling fluid (or mud) and the torque necessary to operate a drill bit 208. The weight of the drill string 202 may provide an axial force on the drill bit 208.

The wellbore drilling environment 200 includes a logging-while-drilling ("LWD") tool 210 positioned on the drill string 202 in the wellbore 206. The LWD tool 210 may include various modules, e.g., a measuring-while-drilling ("MWD") module 212, a compensated dual resistivity ("CDR") module 214, a saver sub 216, and a bit sub 218. The LWD tool 210, using the modules may transmit measurements of one or more characteristics (e.g., characteristics of wellbore 106) to the surface 204. Characteristic measurements may be transmitted to the surface 204 in real-time while the LWD tool 210 is positioned in the wellbore 206. In some aspects, one of the characteristic measurements may include sound (e.g., acoustic waves) within the wellbore 206. The sound may be measured or otherwise sensed by a hydrophone according to an aspect of the present disclosure included in the LWD tool 210. For example, block 220 represents an example placement for a hydrophone according to an aspect of the present disclosure in the measuring-while-drilling module 212. Similar to the wellbore tool 112 of FIG. 1, the measuring-while-drilling module 212 of the LWD tool 210 may include a cavity having wires or other means for electrically coupling a hydrophone to the LWD tool 210 for measurements in the wellbore 206.

Figure 3:
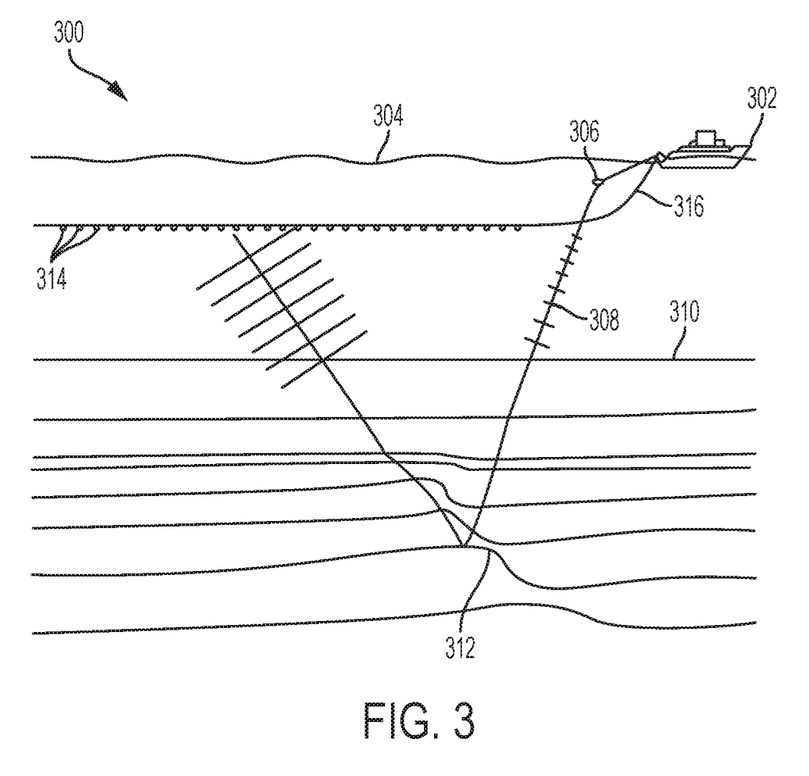
FIG. 3 is a cross-sectional schematic diagram depicting an example of a marine environment for a hydrophone according to an aspect of the present disclosure.

FIG. 3 is a cross-sectional diagram depicting an example of a marine environment 300 for a hydrophone according to one aspect of the present disclosure. A vessel 302 is positioned on a surface 304 of the ocean. The vessel 302 may tow one or more sources 306, such as a seismic source. The source 306 may transmit acoustic waves 308 through the ocean floor 310. The acoustic waves 308 may be reflected or refracted off subterranean formations 312 below the ocean floor 310 and measured by an array of hydrophones 314 trailing behind the vessel 302 on one or more streamers 316 below the surface 304 of the ocean. In some aspects, the hydrophones 314 may trail behind the vessel 302 in a shallow portion of the ocean closer to the surface 304. In other aspects, the hydrophones 314 may trail behind the vessel 302 in a deeper portion of the ocean closer to the ocean floor 310. In some aspects, the streamers 316 may include electrical or fiber-optical cabling for connecting the array of hydrophones 314 to seismic equipment or other acoustic equipment on the vessel 302.

Although FIGS. 1-3 describe a wellbore environment 100 and marine environment 300, respectively, having specific components and configurations for a hydrophone, a hydrophone according to some aspects may be implemented in various environments and with various tools and configurations within the environments without departing from the scope of the present disclosure.

Figure 4:
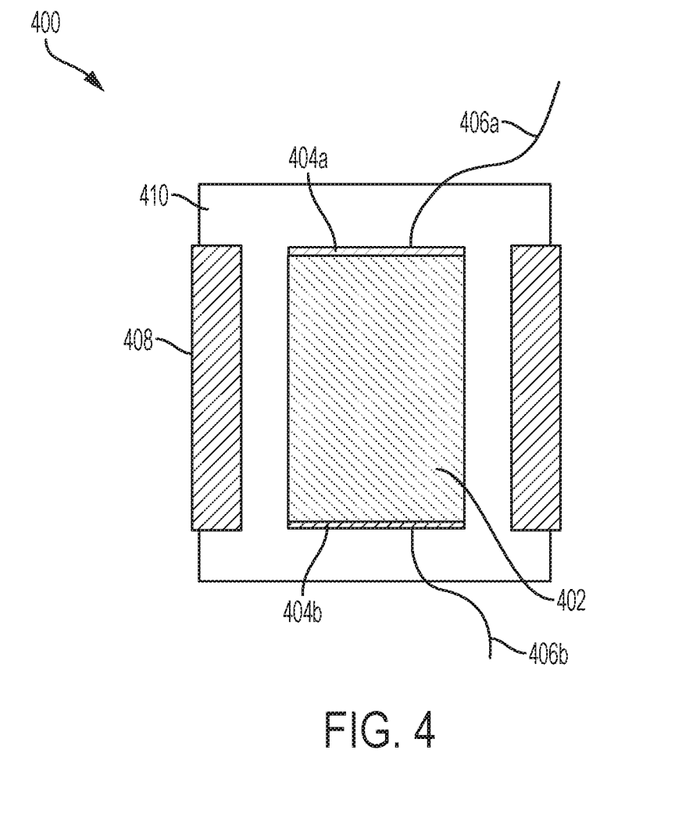
FIG. 4 is a cross-sectional schematic diagram of an example of a hydrophone according to an aspect of the present disclosure.

FIG. 4 is a cross-sectional schematic diagram of an example of a hydrophone 400 according to an aspect of the present disclosure. The hydrophone 400 includes a piezoelectric rod 402 and two electrodes 404a, 404b. The piezoelectric rod 402 may include a solid piezoelectric material defining a contiguous rod shape having no cavities or openings. Non-limiting examples of the piezoelectric material include soft lead zirconate titanate ("soft PZT"), hard lead zirconate titanate ("hard PZT"), and modified lead metaNiobate ceramic. The piezoelectric rod 402 may have properties to generate electrical charge in response to an applied mechanical stress on the piezoelectric material of the piezoelectric rod 402. The electrodes 404a, 404b may be positioned on opposing distal ends of the piezoelectric rod 402 to sandwich the piezoelectric rod 402 between the electrodes 404a, 404b. In some aspects, the electrodes 404a, 404b may include a thin metallic wafer having a cross-sectional shape corresponding to a cross-sectional shape of the piezoelectric rod 402. For example, the piezoelectric rod 402 may have a three-dimensional cylindrical shape having a top cross-sectional shape forming a circle. The electrodes 404a, 404b may have a circular shape of similar or the same diameter as the circular cross-section of the piezoelectric rod 402. Although two electrodes are shown in FIG. 4, more than two electrodes may be included without departing from the scope of the present disclosure.

The electrodes 404a, 404b may include a conductive material to allow charges generated by the piezoelectric rod 402 to flow to electrode wires 406a, 406b extending from the electrodes, respectively. In some aspects, the electrode wires 406a, 406b may be soldered onto, or otherwise coupled to, the electrodes 404a, 404b. The electrode wires 406a, 406b may include electrical wires. In some aspects, the electrode wires 406a, 406b may include an outer screen, coating, or covering to isolate the electrode wires 406a, 406b. In some examples, the electrode wires 406a, 406b and covering may include a twisted-shield-pair wire. In some aspects, the piezoelectric rod 402 may be poled in a longitudinal direction toward one of the electrodes 404a, 404b. The longitudinal poling direction of the piezoelectric rod 402 may allow the electrical charges generated by the piezoelectric rod 402 to flow into the electrodes 404a, 404b to allow the electrical wires 406a, 406b to be used to create a circuit. In some aspects, the electrode wires 406a, 406b may be coupled to a sensing circuit or tool to allow the piezoelectric rod 402 to operate as a transducer, or hydrophone measuring acoustic sound. For example, the piezoelectric rod 402 may generate an electrical charge in response to a mechanical stress caused by a pressure disturbance of acoustic waves on the piezoelectric rod 402. The charge may flow through the piezoelectric rod 402 in the poling direction and through one of the electrodes 404a, 406b and the corresponding electrode wire 406a, 406b to the sensing circuit.

The piezoelectric rod 402 may include an effective piezoelectric coefficient, $d_h$. The effectively piezoelectric coefficient may represent the capability of the piezoelectric rod 402 to generate a charge in response to mechanical stress. In some aspects, a higher effective piezoelectric coefficient may represent a higher potential for the piezoelectric rod 402 to generate a charge. In some aspects, a voltage generated by the charge of the piezoelectric rod 402 may be measured in terms of the effective piezoelectric coefficient. The effective piezoelectric coefficient, $d_h$, may include the sum of piezoelectric coefficients corresponding to the directions of the pressure exerted on the piezoelectric rod 402 (e.g., the sum of $d_{31}$, $d_{32}$, $d_{33}$). For example, where the poling direction is along a z-axis, the piezoelectric coefficients may include $d_{31}$ and $d_{32}$ corresponding to the pressure in the directions perpendicular to the poling direction (e.g., along the x- and y-axes), and $d_{33}$ corresponding to the pressure in the poling direction of the piezoelectric rod 402.

The piezoelectric rod 402 is positioned internal to a housing 408. The housing 408 may include a metallic material. Non-limiting examples of metallic housing materials include steel, bronze, or brass. The metallic material of the housing 408 may increase an acoustic impedance of the hydrophone 400. The increased acoustic impedance may shield acoustic waves. In some aspects, the thickness of the housing 408 may affect the ability of the housing 408 to shield acoustic waves effectively. In some aspects, housing may include a thickness of at least 0.02 inches to achieve acoustic impedance. In some aspects, the housing 408 may include a cross-section corresponding to the cross-section of the piezoelectric rod 402. For example, a piezoelectric rod 402 may include a cylindrical shape having a circular cross-section and the housing 408 may include a cylindrical ring shape encircling the piezoelectric rod 402 and defining an opening in the housing 408 for receiving the piezoelectric rod 402. In other aspects, the housing 408 may have any shape and include a wall that encircles or otherwise bounds at least a portion of the piezoelectric rod 402.

In some aspects, the effective piezoelectric coefficient of the piezoelectric rod 402 may be approximately between 50% and 100% of the piezoelectric coefficient in the poling direction, $d_{33}$ when operating within the housing 408. For example, the piezoelectric rod 402 may include soft PZT normally having $d_{31}$ being −230 pm/V, $d_{32}$ being −230 pm/V, $d_{33}$ being 490 pm/V and $d_h$ being 30 pm/V. The piezoelectric rod 402 positioned in the housing 408 according to aspects of the present disclosure may achieve an effective piezoelectric coefficient about 246 to 290 pm/V.

The piezoelectric rod 402 and the electrodes 404a, 404b may be potted within the housing 408 using a potting material 410. In some aspects, the potting material 410 may include epoxy or any suitable pressure-release material that protects the piezoelectric rod 402 from the environment. Referring to the wellbore environment 100 of FIG. 1, the potting material 410 may protect the piezoelectric rod 402 from corrosion or other damage due to harsh or erosive elements in the wellbore 108 (e.g., wellbore fluid, additives within the fluid, etc.). The potting material 410 may also protect the piezoelectric rod 402 from the high pressures and temperatures in the wellbore 108 as the hydrophone 400 is positioned deeper in the wellbore 108. Referring to the marine environment of FIG. 1, the potting material 410 may protect the piezoelectric rod 402 from corrosion or other damage due to salt in the ocean water or the pressure in ocean as the hydrophone 400 is positioned deeper in the ocean toward the ocean floor 310. In some aspects, the potting material 410 may include an epoxy material with a low coefficient of thermal expansion to increase the robustness of the potting material at high temperatures. Non-limiting examples of epoxy materials that may be used as the potting material 410 include Duralco 4703 epoxy, Insulcast 125, and other epoxy materials having the same or similar thermal expansion coefficients. In some aspects, the potting material 410 may maintain the electrodes 404a, 404b in place adjacent to the distal ends of the piezoelectric rod 402. The electrode wires 406a, 406b may extend through the potting material 410 to remain accessible for connecting to a sensing circuit or wellbore tool. In additional aspects, the potting material 410 may maintain the piezoelectric rod 402 within the housing 408. In some aspects, the potting material 410 may extend beyond a border created by an interior surface of the housing 408 as shown in FIG. 4. A layer of the potting material 410 may be positioned between a longitudinal wall of the piezoelectric rod 402 and the interior surface of the housing 408. In some aspects, the layer of potting material 410 between the piezoelectric rod 402 may not be too thin to allow the longitudinal wall of the piezoelectric rod 402 to be overly constrained by the housing, preventing the piezoelectric rod 402 from distorting (e.g., expanding and contracting) in response to stress. In additional and alternative aspects, the layer may not be so thick as to allow acoustic waves to propagate along the layer. In some aspects, the thickness of the potting material between the piezoelectric rod 402 and the housing 408 may be between 0.02 and 0.2 inches to reduce the contribution of $d_{31}$ and $d_{32}$, and, hence, increase the effective piezoelectric coefficient $d_h$.

Figure 5:
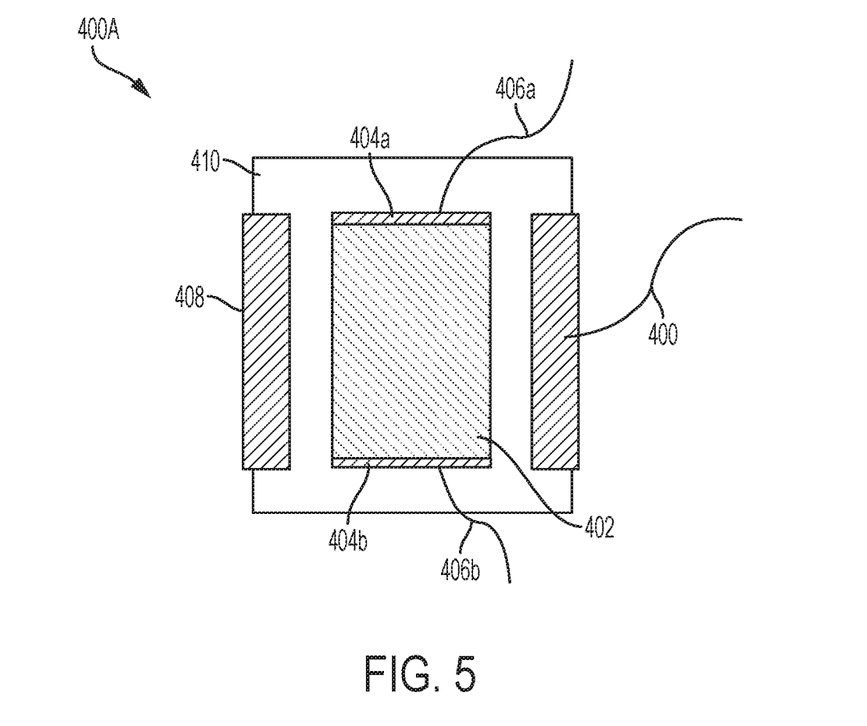
FIG. 5 is a cross-sectional schematic diagram of an example of the hydrophone of FIG. 4 with a housing wire according to an aspect of the present disclosure.

FIG. 5 is a cross-sectional schematic diagram of an example of a hydrophone 400A with a housing wire 500 according to an aspect of the present disclosure. The hydrophone 400A may be identical in configuration to the hydrophone 400 of FIG. 4, but may include the housing wire 500 extending from the housing 408. In some aspects, the housing wire 500 may include an electric wire soldered onto or otherwise coupled to the housing 408. In some aspects, the housing wire 500 may be connected to a ground source. Grounding the housing 408 may cause housing 408 to serve as electromagnetic shielding for the piezoelectric rod 402. In some aspects, the ground source may include a coating, or outer screen, of the electrode wires 406a, 406b. For example, the electrode wires 406a, 406b may be twisted together and connected to a sensing circuitry, and the housing wire 500 may be connected to the coating of the twisted pair of wires 406a, 406b to ground to the housing 408.

In alternative aspects, the housing wire 500 may be connected to a reference potential. In one example, the housing wire 500 may extend from the housing to a twisted-shield-pair feed line cable connecting electronics of a wellbore tool or other devices. The housing 408 via the housing wire 500 may be terminated remotely to a reference potential providing an improved differential interface between the electronics and the hydrophone 400A. In other aspects, the housing wire 500 may be connected to facilitate an electric field shielding. For example, the housing 408 via the housing wire 500 may be terminated to a reference potential equal to the piezoelectric rod's 402 backside electrode (e.g., the electrode 404a, 404b opposite the poling direction of the piezoelectric rod 402). Terminating the housing 408 to a potential equal to the backside electrode may cause the electric fields to terminate onto the housing 408 and avoid electric-to-acoustic noise coupling and interference. In further aspects, the housing wire 500 may be connected to a chassis ground or other local reference potential to provide a conduction path for local magnetic fields that shields electrodes 404a, 404b from eddy currents. The eddy currents induced by the local magnetic fields may avoid flux leakage or coupling with the piezoelectric rod's 402 circuit.

Figure 6:
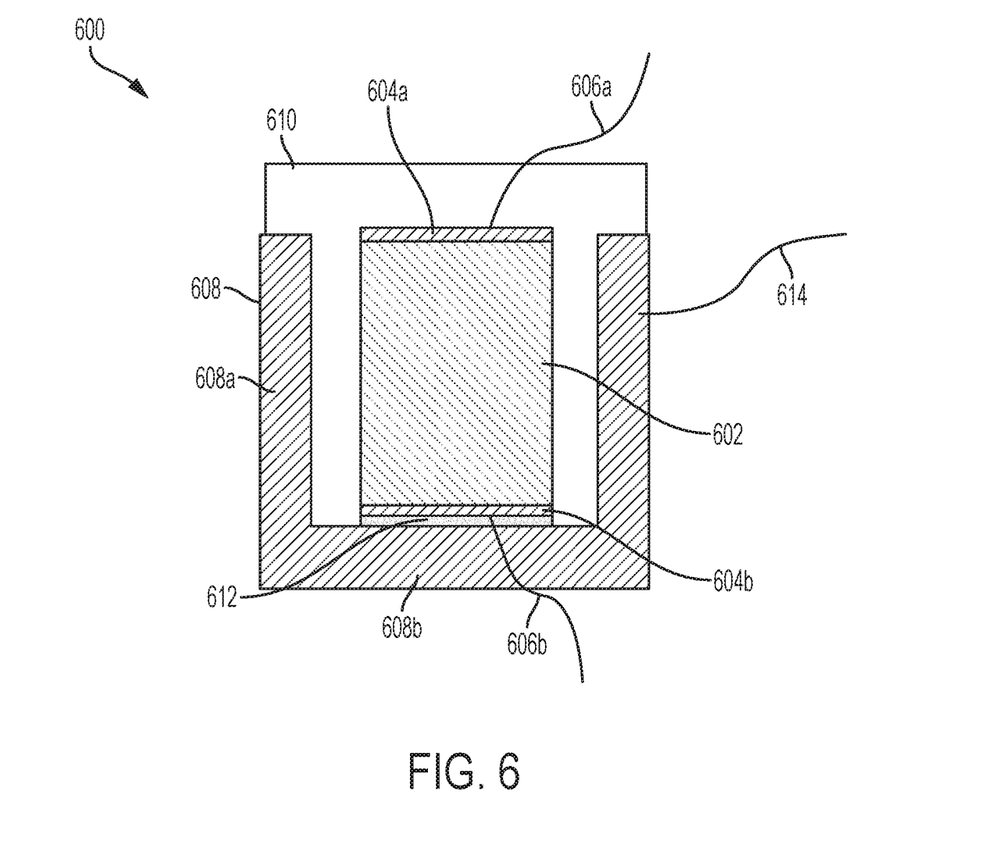
FIG. 6 is a cross-sectional schematic diagram of an example of a hydrophone according to another aspect of the present disclosure.

FIG. 6 is a cross-sectional schematic diagram of an example of a hydrophone 600 according to another aspect of the present disclosure. Similar to the hydrophones 400, 400A of FIGS. 4 and 5, respectively, the hydrophone 600 includes a piezoelectric rod 602 sandwiched between electrodes 604a, 604b. The electrodes 604a, 604b include electrode wires 606a, 606b extending from the electrodes 604a, 604b, respectively that may be connected to a sensing circuitry or tool. The piezoelectric rod 602 and the electrodes 604a, 604b are positioned within a housing 608. The housing 608, similar to the housing 408 of the hydrophones 400, 400A may include a metallic material providing acoustic shielding to the piezoelectric rod 602. The housing 608 includes a housing wall 608a forming a ring-shaped portion encircling or otherwise bounding the piezoelectric rod 602. In some aspects, the housing wall 608a may have the same cross-sectional shape as the cross-section of the piezoelectric rod 602 (e.g., a circular shape). In other aspects, the cross-section of the housing wall 608a may have any shape. The housing 608 also includes a base portion 608b enclosing an opening defined by the housing wall 608a. The housing wall 608a and the base portion 608b may, together, form a cup shape within which the piezoelectric rod 602 and the electrodes 604a, 604b may be positioned, as shown in FIG. 6. In some aspects, the cup shape may increase the Faraday shielding effect of the metallic housing 608. For example, the cup shape may increase the available area for interfering electric field termination. The cup shape may also interrupt the flux path for interfering magnetic fields that may otherwise cut through the piezoelectric rod 602.

The piezoelectric rod 602 and the electrodes 604a, 604b may be potted in the housing 608 using a potting material 610. The potting material 610 may be positioned adjacent to the piezoelectric rod 602 and the electrodes 604a, 604b. A layer of the potting material 610 may separate a longitudinal wall of the piezoelectric rod 602 and the housing wall 608a. In some aspects, the potting material 610 may maintain the electrode 604a on the distal ends of the piezoelectric rod 602. The electrode 604b may be bonded to the base portion 608b of the housing 608 by an epoxy material 612 positioned between the electrode 604b and the base portion 608b. In some aspects, the epoxy material 612 may be electrically conductive. In some aspects, the potting material 610 and the epoxy material 612 may include the same material (e.g., epoxy). The electrode wire 606a may extend from the electrode 604a through the potting material 610. The electrode wire 606b may extend from the electrode 604b through the epoxy material 612 and the housing 608. A housing wire 614 may extend from the housing 608 and be connected to a reference potential similar to the housing wire 500 of FIG. 5. Although the housing wire 614 is shown as extending from an external surface of the housing wall 608a, the housing wire 614 may be soldered or otherwise connected to any surface of the housing 608 and connected to a reference potential to cause the housing 608 to serve as electromagnetic shielding for the piezoelectric rod 602.

In some aspects, the metallic material of the housing wall 608a may be connected at an end portion of the wall opposing the base portion 608b by a conductive layer to form a top portion of the housing 608 and fully enclose the piezoelectric rod 602. The conductive layer may include an acoustic thickness less than 0.25 wavelengths at the lowest acoustic frequency of interest. In one example, the conductive layer may include a thin layer of the metallic material of the housing wall 608 extended to form the top portion. In another example, the conductive layer may include silver (e.g., a silver-filled paint, a silver-filled epoxy). In other examples, the conductive layer may include a copper mesh, a screen, or conductive strips. In one instance, a conductive screen may have openings sized large enough not to attenuate a desired acoustic wave, but small enough to attenuate electromagnetic waves at the same frequency. In alternative aspects, the conductive layer may be disconnected from the housing 608. In further aspects, the housing 608 and the conductive layer may be coupled by overlapping capacitance.

Figure 7:
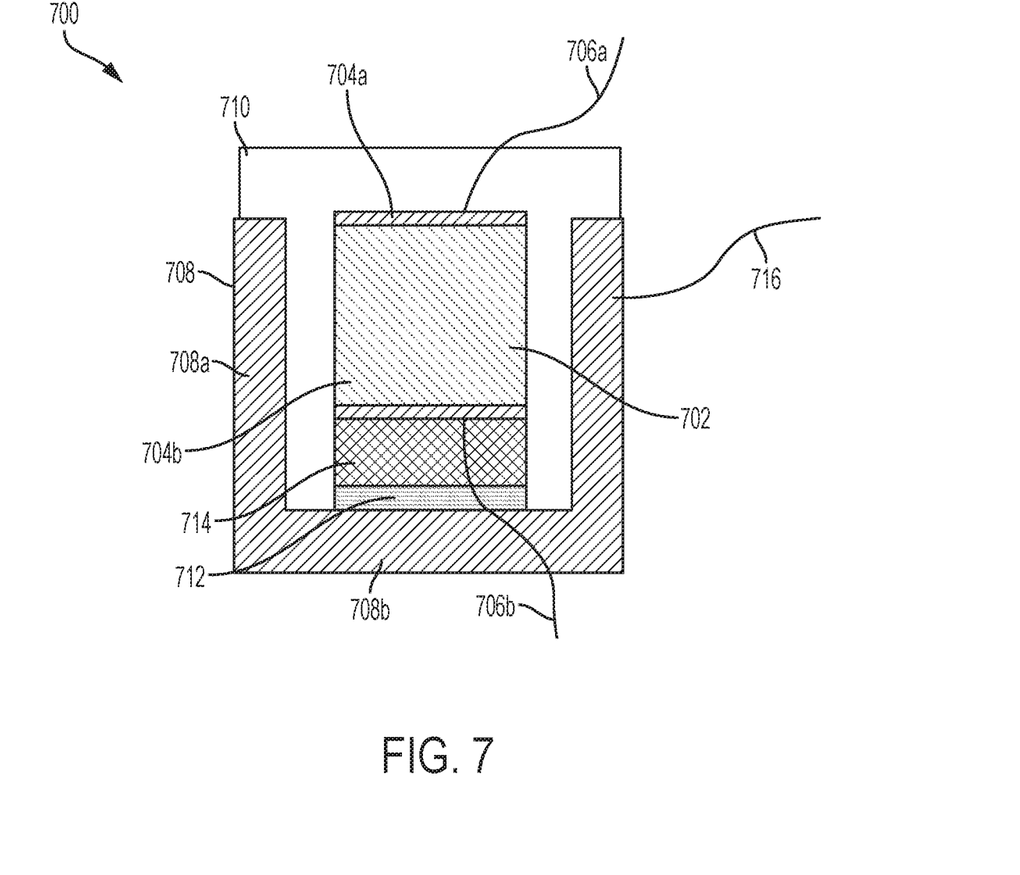
FIG. 7 is a cross-sectional schematic diagram of an example of a hydrophone according to another aspect of the present disclosure.

FIG. 7 is a cross-sectional schematic diagram of an example of a hydrophone 700 according to another aspect of the present disclosure. Similar to the hydrophone 600 of FIG. 6, the hydrophone 700 includes a piezoelectric rod 702 positioned between electrodes 704a, 704b. The electrodes 704a, 704b include electrode wires 706a, 706b extending from the electrodes 704a, extending from the electrodes 704a, 704b, respectively that may be connected to a sensing circuitry or tool. The piezoelectric rod 702 and the electrodes 704a, 704b are positioned within a housing 708 including a housing wall 708a and a base portion 708b forming a cup shape in which the piezoelectric rod 702 and the electrodes 704a, 704b may be positioned. The housing 708 may include a metallic material providing acoustic shielding to the piezoelectric rod 702.

The piezoelectric rod 702 may be potted in the housing 708 using a potting material 710. The potting material 710 may be positioned around the piezoelectric rod 702 and may include a layer positioned between a longitudinal wall of the piezoelectric rod 702 and an interior surface of the housing wall 708a. The electrode 704b may be bonded to the base portion 708b of the housing 708 using an epoxy material 712 and a backing material 714. In some aspects, the epoxy material 712 and the potting material 710 may be the same material (e.g., epoxy). The backing material 714 may include a dampening material to decrease, or dampen, a "ringing" of the piezoelectric rod 702 in response to acoustic waves or other stress. For example, the backing material 714 may shorten a spatial pulse length of the piezoelectric rod 702 to improve axial resolution. Non-limiting examples of backing material 714 may include metal, ceramic, epoxy loaded with solid power, or other suitable material for dampening the ringing effect of the piezoelectric rod 702. In some aspects, the acoustic impedance of the backing material 714 may be similar to the acoustic impedance of the piezoelectric rod 702.

The electrode wire 706a may extend from the electrode 704a through the potting material 710. The electrode wire 706b may extend from the electrode 704b through the epoxy material 712, the backing material 714, and the housing 708. A housing wire 716 may extend from the housing 708 and be connected to a reference potential similar to the housing wires 500, 614 of FIGS. 5 and 6. Although the housing wire 716 is shown as extending from an external surface of the housing wall 708a, the housing wire 716 may be soldered or otherwise connected to any surface of the housing 708 and connected to a reference potential to cause the housing 708 to serve as electromagnetic shielding for the piezoelectric rod 702.

Figure 8:
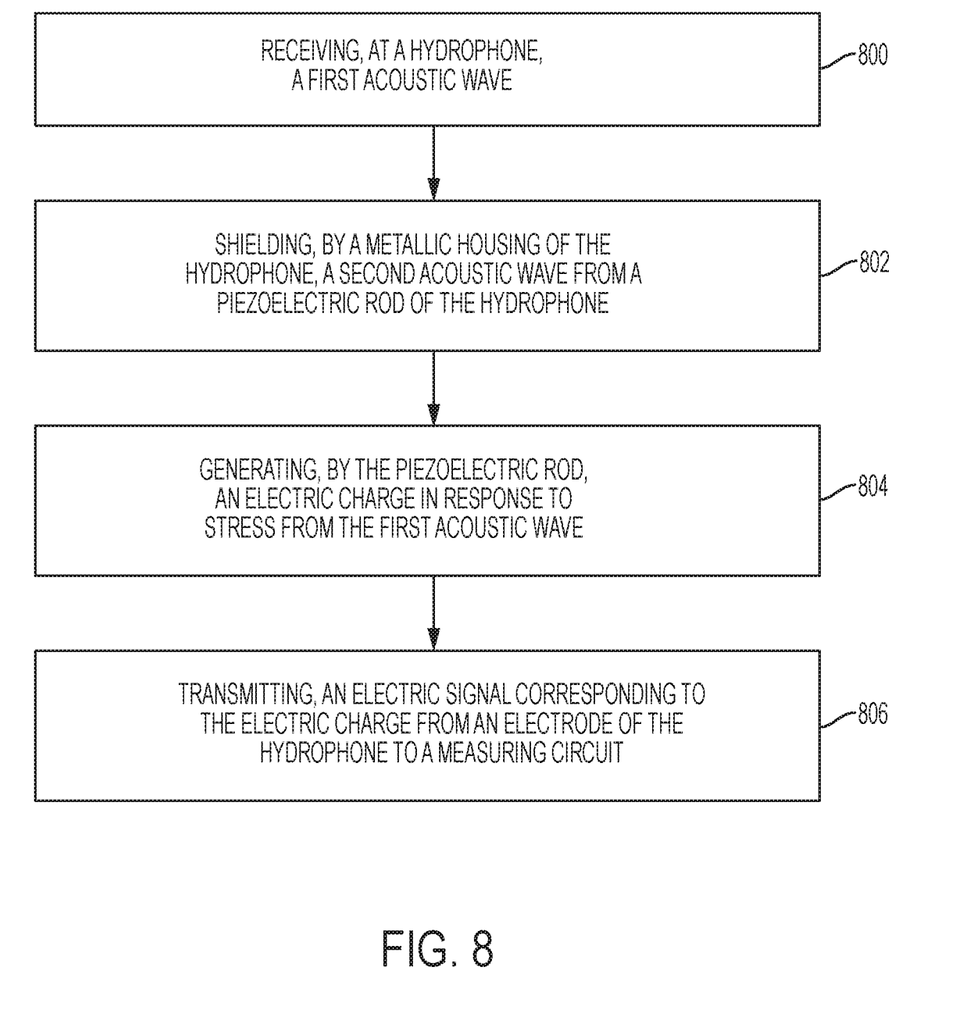
FIG. 8 is a flow chart of a process for sensing an acoustic wave by a hydrophone according to aspects of the present disclosure.

FIG. 8 is a flow chart of a process for sensing an acoustic wave by a hydrophone according to aspects of the present disclosure. The process is described with respect to the hydrophones 400, 400A, 600, 700 of FIGS. 4-7, respectively, though other implementations are possible without departing from the scope of the present disclosure.

In block 800, a first acoustic wave is received by a hydrophone. In some aspects, the acoustic wave may correspond to reflections of sounds in a high-pressure, high-temperature environment such as downhole in a wellbore (e.g., wellbore 108 of FIG. 1, wellbore xxx of FIG. 2, or below the surface 304 of the ocean of FIG. 3). In some aspects, the first acoustic wave may be received by the piezoelectric rod 402, 602, 702 of the hydrophone.

In block 802, the metallic housing 408, 608, 708 of the hydrophone shields the piezoelectric rod 402, 602, 702 from a second acoustic wave. In some aspects, the second acoustic wave may correspond to noise in the wellbore 108 of FIG. 1, the wellbore xxx of FIG. 2, or below the surface 304 of the ocean of FIG. 3. For example, the second acoustic wave may correspond to acoustic or electric noise in the environment. In one example, the noise may be generated in response electrical interference from one or more components, such as a motor-driven device, positioned proximate to the hydrophone. The metallic housing 408, 608, 708 may prevent the second acoustic wave from contacting the piezoelectric rod 402, 602, 702. In some aspects, the metallic housing 408, 608, 708 may generate an electromagnetic shield to prevent the second acoustic wave from contacting the piezoelectric rod 402, 602, 702. For example, the metallic housing 702 includes the housing wire 716 that may be connected to a ground source, such as a chassis ground, a feed cable of the wellbore tool 112 of FIG. 1, or feed cable of the sensor array. In one example, the housing wire 716 may be connected to a shield coating, or shield covering, positioned around the electrode wires 706a, 706b.

In block 804, the piezoelectric rod 402, 602, 702 generates a charge in response to stress caused by the first acoustic wave. For example, the piezoelectric rod 402, 602, 702 may include piezoelectric material, such as soft PZT, hard PZT, or modified lead metaNiobate ceramic, that has properties to generate a charge in response to mechanical stress. The acoustic wave may place a mechanical stress on the piezoelectric rod 402, 602, 702 to cause the piezoelectric rod 402, 602, 702 to generate the charge.

In block 806, an electric signal corresponding to the charge may be transmitted to measuring circuit connected to one or more of the electrodes 404a, 404b, 604a, 604b, 704a, 704b of the hydrophone. In some aspects, the electric signal may include an amplified signal generated or amplified by a voltage amplifier or a charge amplifier. The electrodes 404a, 404b, 604a, 604b, 704a, 704b may be connected to the measuring circuit by an electrode wire 406a, 406b, 606a, 606b, 706a, 706b, respectively, to transmit the charge from respective electrode to the measuring circuit.

In some aspects, a method or apparatus may be provided according to one or more of the following examples:

Example 1: A solid-state hydrophone may include a metallic housing. The hydrophone may also include a piezoelectric rod disposed within the metallic housing and positioned between at least two electrodes. The piezoelectric rod may include a solid piezoelectric material forming a contiguous rod shape. The hydrophone may also include potting material positioned adjacent to the piezoelectric rod. At least a layer of the potting material may be positioned between the piezoelectric rod and the metallic housing.

Example 2: The solid-state hydrophone of Example 1 may feature the metallic housing including a ring shape encircling the piezoelectric rod to shield a longitudinal wall of the piezoelectric rod from acoustic waves.

Example 3: The solid-state hydrophone of Examples 1-2 may feature the metallic housing has a cup shape including a ring portion encircling the piezoelectric rod to shield a longitudinal wall of the piezoelectric rod from acoustic waves and a base portion enclosing an end of the ring portion. One electrode of the at least two electrodes may be bonded to the base portion of the metallic housing.

Example 4: The solid-state hydrophone of Examples 1-3 may feature the piezoelectric rod being enclosed by the metallic housing and a conductive layer positioned adjacent to an opposing end of the ring portion opposite the end of the ring portion enclosed by the base portion.

Example 5: The solid-state hydrophone of Examples 1-4 may feature the one electrode being bonded to the base portion of the metallic housing by a backing material and the potting material.

Example 6: The solid-state hydrophone of Examples 1-5 may feature the metallic housing including an electric wire coupled to the metallic housing and extending from the metallic housing to a reference potential to create an electromagnetic shield.

Example 7: The solid-state hydrophone of Example 6 may further include electrode wires coupled to the at least two electrodes and having a shield covering, wherein the shield covering is the reference potential.

Example 8: The solid-state hydrophone of Examples 1-7 may feature the metallic housing including an electric wire coupled to the metallic housing and extending from the metallic housing to a shield covering of a feed line cable.

Example 9: A method may include receiving, at a solid-state hydrophone, an acoustic wave. The solid-state hydrophone may include a metallic housing. The hydrophone may also include a piezoelectric rod disposed within the metallic housing and positioned between at least two electrodes. The piezoelectric rod may include a solid piezoelectric material forming a contiguous rod shape. The hydrophone may also include potting material positioned adjacent to the piezoelectric rod. At least a layer of the potting material being positioned between the piezoelectric rod and the metallic housing. The method may also include shielding, by the metallic housing, one or more surfaces of the piezoelectric rod from a second acoustic wave. The method may also include generating, by the piezoelectric rod, an electric charge in response to a stress on the piezoelectric rod caused by the acoustic wave. The method may also include transmitting, by an electrode of the at least two electrodes, an electric signal corresponding to the electric charge to a measuring circuit electrically coupled to the electrode by an electrode wire attached to the electrode.

Example 10: The method of Example 9 may feature the second acoustic wave corresponding to noise. The method may also feature shielding the one or more surfaces of the piezoelectric rod from the second acoustic wave including preventing the piezoelectric rod from generating the electric charge in response to the noise.

Example 11: The method of Examples 9-10 may feature shielding the one or more surfaces of the piezoelectric rod from the second acoustic wave including generating, the metallic housing, an electromagnetic shield, wherein the metallic housing is electrically coupled to a reference potential.

Example 12: The method of Example 11 may feature the electrode wire attached to the electrode including a shield covering operable as the reference potential. The method may also feature the metallic housing being electrically coupled to the shield covering of the electrode wire by an electric wire extending from the metallic housing.

Example 13: The method of Examples 9-12 may feature the metallic housing having a ring shape encircling the piezoelectric rod. The method may also feature shielding the one or more surfaces of the piezoelectric rod to include shielding a longitudinal wall of the piezoelectric rod from the second acoustic wave.

Example 14: The method of Examples 9-13 may feature the metallic housing having a cup shape including a ring portion encircling the piezoelectric rod to shield a longitudinal wall of the piezoelectric rod from the second acoustic wave and a base portion enclosing an end of the ring portion.

Example 15: The method of Example 14 may feature at least one electrode of the at least two electrodes being bonded to the base portion of the metallic housing.

Example 16: A wellbore tool positionable downhole in a wellbore, the wellbore tool including a motor mechanically couplable to the wellbore tool and actuatable to rotate the wellbore tool in the wellbore. The tool may also include a cavity within a housing of the wellbore tool. The tool may also include a hydrophone positionable in the cavity and electrically couplable to the wellbore tool. The hydrophone may include a piezoelectric rod positioned between at least two electrodes and potted within a metallic housing by a potting material. The piezoelectric rod may include a solid piezoelectric material forming a contiguous rod shape. The hydrophone may also include electrode wires extending from the at least two electrodes, the electrode wires electrically couplable to circuitry of the wellbore tool within the cavity.

Example 17: The wellbore tool of Example 16 may feature the metallic housing of the hydrophone having a ring shape surround a portion of the piezoelectric rod. The tool may also feature at least a layer of the potting material being positioned between the piezoelectric rod and an interior surface of the metallic housing. The tool may also feature the electrode wires extending from the at least two electrodes through the potting material.

Example 18: The wellbore tool of Examples 16-17 may feature the metallic housing of the hydrophone having a cup shape surrounding a portion of the piezoelectric rod. The tool may also feature at least one of the electrode wires extending from a first electrode of the at least two electrodes through the metallic housing. The tool may also feature the first electrode being bonded to the metallic housing.

Example 19: The wellbore tool of Examples 16-18 may feature the metallic housing of the hydrophone including an electric wire coupled to the metallic housing and extending from the metallic housing to a reference potential to create an electromagnetic shield.

Example 20: The wellbore tool of Example 19 may feature the electrode wires extending from the at least two electrodes including a shield covering. The tool may also feature the shield covering being the reference potential.

The foregoing description of the examples, including illustrated examples, has been presented only for the purpose of illustration and description and is not intended to be exhaustive or to limit the subject matter to the precise forms disclosed. Numerous modifications, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:
1. A solid-state hydrophone, comprising:
   a metallic housing;
   a piezoelectric rod disposed within the metallic housing and positioned between at least two electrodes that are substantially parallel to one another, the piezoelectric rod including a solid piezoelectric material forming a solid rod shape; and
   potting material positioned adjacent to the piezoelectric rod, wherein at least a layer of the potting material is positioned between the piezoelectric rod and the metallic housing.

2. The solid-state hydrophone of claim 1, wherein the metallic housing includes a ring shape encircling the piezoelectric rod to shield a longitudinal wall of the piezoelectric rod from acoustic waves.

3. The solid-state hydrophone of claim 1, wherein the metallic housing has a cup shape including a ring portion encircling the piezoelectric rod to shield a longitudinal wall of the piezoelectric rod from acoustic waves and a base portion enclosing an end of the ring portion,
   wherein one electrode of the at least two electrodes is bonded to the base portion of the metallic housing.

4. The solid-state hydrophone of claim 3, wherein the piezoelectric rod is enclosed by the metallic housing and a conductive layer positioned adjacent to an opposing end of the ring portion opposite the end of the ring portion enclosed by the base portion.

5. The solid-state hydrophone of claim 3, wherein the one electrode is bonded to the base portion of the metallic housing by a backing material and the potting material, wherein the backing material is a dampening material configured to dampen the piezoelectric rod.

6. The solid-state hydrophone of claim 1, wherein the metallic housing includes an electric wire coupled to the metallic housing and extending from the metallic housing to a reference potential to create an electromagnetic shield, further comprising electrode wires coupled to the at least two electrodes and having a shield covering, wherein the shield covering is the reference potential.

7. The solid-state hydrophone of claim 1, wherein the metallic housing includes an electric wire coupled to the metallic housing and extending from the metallic housing to a shield covering of a feed line cable.

8. The solid-state hydrophone of claim 1, wherein the solid rod shape includes a continuous, solid rod without cavities.

9. The solid-state hydrophone of claim 1, wherein a first electrode of the at least two electrodes is positioned on a first end of the piezoelectric rod, and wherein a second electrode of the at least two electrodes is positioned on a second end of the piezoelectric rod that is opposite to the first end.

10. A method, comprising:
    receiving, at a solid-state hydrophone, an acoustic wave, the solid-state hydrophone comprising:
       a metallic housing;
       a piezoelectric rod disposed within the metallic housing and positioned between at least two electrodes that are substantially parallel to one another, the piezoelectric rod including a solid piezoelectric material forming a solid rod shape; and
       potting material positioned adjacent to the piezoelectric rod, at least a layer of the potting material being positioned between the piezoelectric rod and the metallic housing;
    shielding, by the metallic housing, one or more surfaces of the piezoelectric rod from a second acoustic wave;

generating, by the piezoelectric rod, an electric charge in response to a stress on the piezoelectric rod caused by the acoustic wave; and transmitting, by an electrode of the at least two electrodes, an electric signal corresponding to the electric charge to a measuring circuit electrically coupled to the electrode by an electrode wire attached to the electrode.

11. The method of claim 10, wherein the second acoustic wave corresponds to noise, wherein shielding the one or more surfaces of the piezoelectric rod from the second acoustic wave includes preventing the piezoelectric rod from generating the electric charge in response to the noise.

12. The method of claim 10, wherein shielding the one or more surfaces of the piezoelectric rod from the second acoustic wave includes generating, the metallic housing, an electromagnetic shield, wherein the metallic housing is electrically coupled to a reference potential.

13. The method of claim 12, wherein the electrode wire attached to the electrode includes a shield covering operable as the reference potential, wherein the metallic housing is electrically coupled to the shield covering of the electrode wire by an electric wire extending from the metallic housing.

14. The method of claim 10, wherein the metallic housing has a ring shape encircling the piezoelectric rod,
wherein shielding the one or more surfaces of the piezoelectric rod includes shielding a longitudinal wall of the piezoelectric rod from the second acoustic wave.

15. The method of claim 10, wherein the metallic housing has a cup shape including a ring portion encircling the piezoelectric rod to shield a longitudinal wall of the piezoelectric rod from the second acoustic wave and a base portion enclosing an end of the ring portion, and wherein at least one electrode of the at least two electrodes is bonded to the base portion of the metallic housing.

16. A wellbore tool positionable downhole in a wellbore, the wellbore tool comprising:
a motor mechanically couplable to the wellbore tool and actuatable to rotate the wellbore tool in the wellbore;
a cavity within a housing of the wellbore tool; and
a hydrophone positionable in the cavity and electrically couplable to the wellbore tool, the hydrophone including:
a piezoelectric rod positioned between at least two electrodes that are substantially parallel to one another, the at least two electrodes potted within a metallic housing by a potting material, the piezoelectric rod including a solid piezoelectric material forming a solid rod shape; and
electrode wires extending from the at least two electrodes, the electrode wires electrically couplable to circuitry of the wellbore tool within the cavity.

17. The wellbore tool of claim 16, wherein the metallic housing of the hydrophone has a ring shape surround a portion of the piezoelectric rod,
wherein at least a layer of the potting material is positioned between the piezoelectric rod and an interior surface of the metallic housing, and
wherein the electrode wires extend from the at least two electrodes through the potting material.

18. The wellbore tool of claim 16, wherein the metallic housing of the hydrophone has a cup shape surrounding a portion of the piezoelectric rod,
wherein at least one of the electrode wires extends from a first electrode of the at least two electrodes through the metallic housing, and
wherein the first electrode is bonded to the metallic housing.

19. The wellbore tool of claim 16, wherein the metallic housing of the hydrophone includes an electric wire coupled to the metallic housing and extending from the metallic housing to a reference potential to create an electromagnetic shield.

20. The wellbore tool of claim 19, wherein the electrode wires extending from the at least two electrodes include a shield covering, wherein the shield covering is the reference potential.

* * * * *